3,147,753
SYRINGE PISTON
Louis Nogier, 11 Quai Claude Bernard, Lyon 7, France,
and Paul Nogier, 4 Rue Paul Lintier, Lyon 2, France
Filed Feb. 2, 1962, Ser. No. 170,646
Claims priority, application France Feb. 8, 1961
4 Claims. (Cl. 128—218)

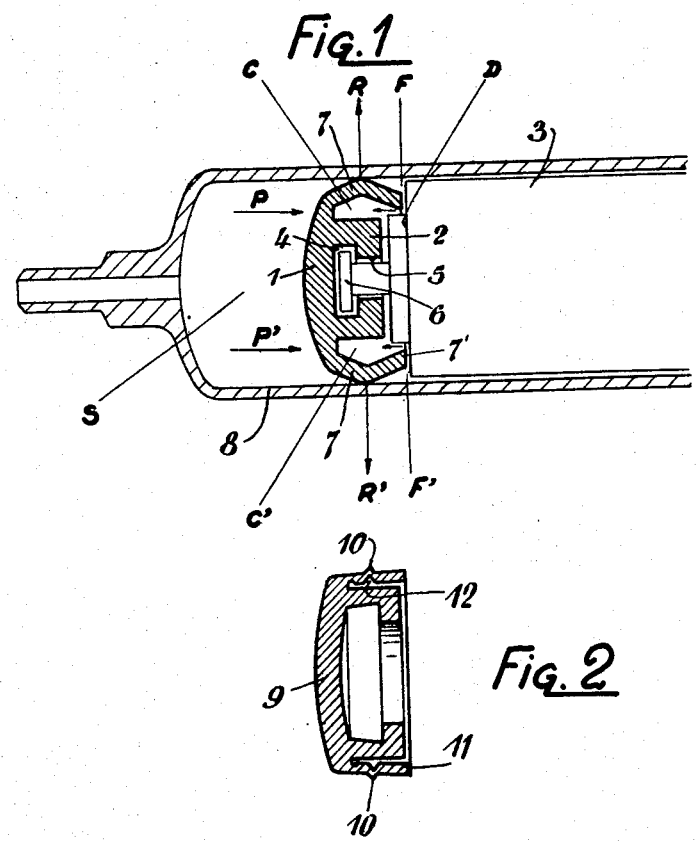
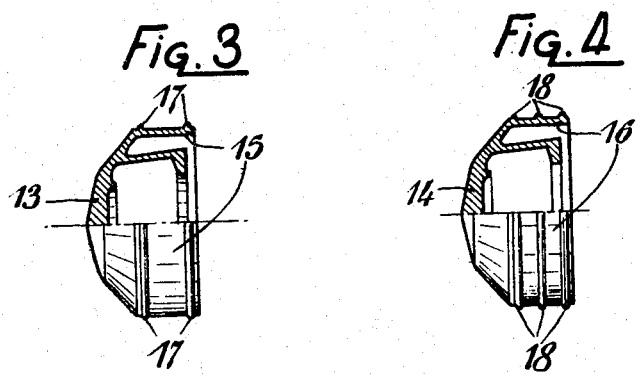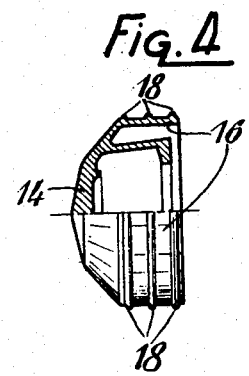

The joints or piston heads used heretofore in syringes of plastic material had the following drawbacks:

Either the displacing effort was too great when the tightness was complete at low and high pressures, Or the tightness was slightly imperfect at low pressures when the displacing effort was slight.

Lastly, it was difficult to clean, and therefore to sterilize, all the joints housed in one groove.

The new joint of this invention aims at preventing all such drawbacks. It is convex and all its portions which come into contact with the liquid to be injected have smooth outlines. It requires only a slight effort for its displacement, owing to the fact that it is only slightly forced in and that those of its parts which are subjected to such forcing in are thin. It is perfectly fluid-tight at low and high working pressures, owing to a special self-fitting arrangement which works in a different way for depressions and for overpressures. Besides, it is readily attached to the end of a rod which acts both as its push-rod and as its guide, and it is easily removed, if desired, after the piston is removed from the syringe body.

The appended drawing shows, by way of non-limitative example, some embodiments of the present invention.

In this drawing:

FIG. 1 is a sectional view, on an enlarged scale, of the joint of the invention according to a first embodiment, said joint being shown fitted on the end of a push-rod and inside a syringe body in diagrammatic section;

FIG. 2 shows in section, on an enlarged scale, a second embodiment of the joint according to the invention;

FIGS. 3 and 4 are partly sectional views, on an enlarged scale, of two further embodiments of the double-acting joint according to the invention.

According to FIG. 1, said joint or piston head 1 is made fo a flexible material which cannot be altered either by the products used in the syringe, or by ageing or heat up to 120° C.; certain synthetic rubbers are very satisfactory in this respect.

In syringes intended to be used only once, it is also possible to use injection-molding plastic materials for making such joints, since in that case a high heat resistance is not essential.

Said joint 1 is circular and is essentially constituted by two parts:

(1) A central and internal portion 2 used for securing the joint 1 on its support 3, which securing may be effected in a variety of ways, in particular either through internal hooking or through external hooking with or without any intermediate member embedded in the joint body. In the present embodiment shown in the drawing, the hooking is internal, the central body 2 of the joint 1 being formed with a circular recess 4 which is definitely larger than its opening 5 and the securing being thus obtained by inserting in said recess 4 the end of the piston 3, while exerting some pressure slantwise; after the button-shaped free end 6 of the projection extending forwardly from the front face D of the piston 3 has been inserted in the recess 4, the lips of the opening 5, which had expanded as the head of the button 6 was passing, close again behind said head. As will be noted from FIG. 1 the axial length of the recess 4 is slightly greater than that of the button-shaped free end 6 so that the piston head 1 can move slightly in axial direction with respect to piston 3.

(2) A peripheral or lip portion 7, which provides the fluid-tightness with respect to the barrel or cylinder 8 of the syringe on compression and on depression; said portion 7 has a special shape, so that:

(a) On depression, the operation is quite simple, provided a little clearance is left along arrows F and F': when the piston 3 is pulled, the relative overpressure existing in the annular cavity C—C' with respect to the cavity S of the syringe body presses the peripheral lip 7 of the joint against the wall of the barrel 8, the higher the depression in the cavity S the better the tightness of said lip 7.

(b) On compression, the tightness is obtained through a completely different process: the pressures P and P' built up on the whole front area of the joint 1 are converted, owing to the special shape of the joint, into radial pressures R and R' which press more and more forcibly the contact area of the joint against the wall of the barrel 8; as a matter of fact, the rear face 7' of peripheral lip 7 is pressed against the front face D of the piston 3 by the pressures P and P', whereby said lip tends to buckle so that its central portion is pushed by the resultant of the forces against the inner surface of the cylinder 8.

In FIGS. 2, 3 and 4, which illustrate modified embodiments of the joint just described, the peripheral lip 7 may comprise one or more juxtaposed circular reeds adapted to come into contact with the wall of the barrel 8.

In the case of the joint 9 (FIG. 2), which includes only one medial contact reed 10, the peripheral lip 11 is advantageously hollowed out by a circular groove 12 at right angles with the external reed 10. Said groove 12 tends to increase the flexibility of the peripheral lip 11 so as to allow the latter to buckle more easily when the joint 9 is compressed.

In the case of joints 13 (FIG. 3) and 14 (FIG. 4), the peripheral lips 15 and 16 are provided respectively with two reeds 17 (FIG. 3) and three reeds 18 (FIG. 4). Said parallel reeds contacting the barrel wall are advantageously distributed across the width of the peripheral lip and contribute to a great extent to improve the tightness thereof.

In all cases, the peripheral lip is adequately thin and its forcing in is adequately light, so that the sliding effort is very small.

What we claim is:

1. In a syringe, in combination, a cylinder having a closed end formed with a bore therethrough; a piston slidably located in the cylinder and having a front end portion of reduced diameter facing said closed end and a main portion having a diameter larger than said front end portion but smaller than that of said cylinder so as to form a shoulder face rearwardly of said front end portion; and a piston head formed from elastically deformable material located between said main portion of said piston and said closed end of said cylinder and having a central portion engaged by said front end portion of said piston and an annular lip portion surrounding said central portion spaced therefrom and being connected at a front end thereof to said central portion, said lip portion curving convexly and rearwardly from said front end and engaging intermediate its ends the inner surface of said cylinder substantially along a line contact, said lip portion having a rear face facing said shoulder face and being slightly spaced therefrom, whereby upon compression of fluid between said closed end of said cylinder and said piston head, pressure exerted on said piston head will tend to bend a portion of said head between said line of contact and said central portion rearwardly so as to press said rear face of said lip portion against said shoulder face to cause thereby said lip portion to buckle and to press portions of said head adjacent said line of contact with increasing force against the inner surface of said cylinder.

2. In a syringe, in combination, a cylinder having a closed end formed with a bore therethrough; a piston slidably located in the cylinder and having a front end portion of reduced diameter facing said closed end and a main portion having a diameter larger than said front end portion but smaller than that of said cylinder so as to form a shoulder face rearwardly of said front end portion; and a piston head formed from elastically deformable material located between said main portion of said piston and said closed end of said cylinder and having a central portion hold by said front end portion of said piston movable to a limited extent in axial direction with respect thereto and an annular lip portion surrounding said central portion spaced therefrom and being connected at a front end thereof to said central portion, said lip portion curving convexly and rearwardly from said front end and engaging intermediate its ends the inner surface of said cylinder substantially along a line contact, said annular lip portion having a rear end spaced from the inner surface of said cylinder and said rear end having rear face facing said shoulder face and being slightly spaced therefrom, whereby upon compression of fluid between said closed end of said cylinder and said piston head pressure exerted on said piston head will tend to push said head rearwardly with respect to said piston so as to press said rear face of said lip portion against said shoulder face to cause thereby said lip portion to buckle and to press portions of said head adjacent said line of contact with increasing force against the inner surface of said cylinder.

3. In a syringe, in combination, a cylinder having a closed end formed with a bore therethrough; a piston of a diameter smaller than that of said cylinder slidably located in the latter and having a front face facing said closed end of said cylinder and a projection projecting forwardly from said front face and having a transversely enlarged free end; and a piston head formed from elastically deformable material located between said front end portion of said piston and said closed end of said cylinder and having a central portion formed with a blind bore having a front portion of wider cross section than an open rear portion thereof and of an axial length greater than that of said transversely enlarged free end of said projection and said projection being located in said blind bore with said enlarged end of said projection in said front portion of said bore so that said head is anchored to said piston movable to a limited extent in axial direction relative thereto, said head including further an annular lip portion surrounding said central portion spaced therefrom and being connected at a front end thereof to said central portion, said lip portion curving convexly and rearwardly from said front end and engaging intermediate its ends the inner surface of said cylinder substantially along a line contact, said lip portion having a rear face facing said front face of said piston and being slightly spaced therefrom whereby upon compression of fluid between said closed end of said cylinder and said piston head, pressure exerted on said piston head will tend to push said head rearwardly with respect to said piston so as to press said rear face of said lip portion against said front face of said piston to cause thereby said lip portion to buckle and to press portions of said head adjacent said line of contact with increasing force against the inner surface of said cylinder.

4. A syringe as set forth in claim 1 in which said lip portion is formed with at least one annular rim of substantially triangular cross section which forms said line of contact.

References Cited in the file of this patent
UNITED STATES PATENTS

| | | |
|---|---|---|
| 2,602,447 | Kollsman | July 8, 1952 |
| 2,688,325 | Lockhart | Sept. 7, 1954 |
| 2,884,291 | Whitten | Apr. 28, 1959 |
| 2,886,034 | Robinson | May 12, 1959 |
| 2,907,330 | Laub | Oct. 6, 1959 |